United States Patent

Maucher et al.

[11] Patent Number: 5,871,401
[45] Date of Patent: *Feb. 16, 1999

[54] TORSION DAMPING APPARATUS FOR USE WITH FRICTION CLUTCHES IN THE POWER TRAINS OF MOTOR VEHICLES

[75] Inventors: Paul Maucher, Sasbach; Oswald Friedmann, Lichtenau, both of Germany

[73] Assignee: LuK Lamellen und Kupplungsbau GmbH, Bühl, Germany

[*] Notice: The term of this patent shall not extend beyond the expiration date of Pat. No. 5,180,335.

[21] Appl. No.: 478,185

[22] Filed: Jun. 7, 1995

Related U.S. Application Data

[62] Division of Ser. No. 162,668, Dec. 6, 1993, Pat. No. 5,456,634, which is a continuation of Ser. No. 872,831, Apr. 23, 1992, Pat. No. 5,269,725, which is a continuation of Ser. No. 810,013, Dec. 18, 1991, Pat. No. 5,338,049, which is a division of Ser. No. 643,150, Jan. 18, 1991, Pat. No. 5,151,065, which is a continuation of Ser. No. 416,954, Oct. 4, 1989, abandoned, which is a division of Ser. No. 256,236, Oct. 11, 1988, Pat. No. 5,180,335, which is a continuation of Ser. No. 717,327, Mar. 29, 1985, abandoned.

[30] Foreign Application Priority Data

Jun. 12, 1984 [DE] Germany ............................ 34 21 698.7
Jul. 7, 1984 [DE] Germany ............................ 34 25 159.6

[51] Int. Cl.⁶ ...................................................... F16D 3/14
[52] U.S. Cl. .............................................................. 464/68
[58] Field of Search ........................ 464/68, 64; 74/574; 192/106.2, 70.17, 212, 213.11

[56] References Cited

U.S. PATENT DOCUMENTS

| | | | |
|---|---|---|---|
| 5,123,877 | 6/1992 | Maucher et al. | 464/68 |
| 5,151,065 | 9/1992 | Maucher et al. | 464/68 |
| 5,180,335 | 1/1993 | Maucher et al. | 464/68 |
| 5,269,625 | 12/1993 | Maucher et al. | 464/68 |
| 5,456,634 | 10/1995 | Maucher et al. | 464/68 |

FOREIGN PATENT DOCUMENTS

| | | |
|---|---|---|
| 56-120424 | 9/1981 | Japan . |
| 58-112738 | 8/1983 | Japan . |
| 58-114923 | 8/1983 | Japan . |

*Primary Examiner*—Eileen A. Dunn
*Attorney, Agent, or Firm*—Darby & Darby

[57] ABSTRACT

A torsion damping apparatus which is installed between the crankshaft of the engine and the friction clutch in a motor vehicle has two coaxial flywheels which are rotatable relative to each other against the opposition of a composite damper. The composite damper has two dampers which operate in series and a friction generating device which operates between one of the dampers and one of the flywheels. One of the flywheels has an axial projection which centers a flange of the composite damper.

40 Claims, 7 Drawing Sheets

TORSION DAMPING APPARATUS FOR USE WITH FRICTION CLUTCHES IN THE POWER TRAINS OF MOTOR VEHICLES

CROSS-REFERENCE TO RELATED APPLICATIONS

This is a division of the patent application Ser. No. 08/162,668 filed Dec. 6, 1993, now U.S. Pat. No. 5,456,634 granted Oct. 10, 1995. The patent application Ser. No. 08/162,668 is a continuation of patent application Ser. No. 07/872,831 filed Apr. 23, 1992, now U.S. Pat. No. 5,269,725 which, in turn, is a continuation of patent application Ser. No. 07/810,013 filed Dec. 18, 1991, now U.S. Pat. No. 5,338,040 which, in turn, is a division of patent application Ser. No. 07/643,150 filed Jan. 18, 1991, now U.S. Pat. No. 5,151,065 which, in turn, is a continuation of patent application Ser. No. 07/416,954 filed Oct. 4, 1989, now abandoned which, in turn, is a division of patent application Ser. No. 07/256,236 filed Oct. 11, 1988, now U.S. Pat. No. 5,180,335 which, in turn, is a continuation of patent application Ser. No. 06/717,327 filed Mar. 29, 1985, now abandoned.

BACKGROUND OF THE INVENTION

The invention relates to torsion damping apparatus or assemblies, especially to torsion damping apparatus which can be installed between the internal combustion engine and the variable-speed or change-speed transmission of a motor vehicle to transmit torque between the input element of the transmission and the engine when the friction clutch of the vehicle is engaged. Somewhat similar torque transmitting and torsion damping apparatus are disclosed in commonly owned copending patent application Ser. No. 06/669,657 of Oswald Friedmann for "Torsion damping assembly for motor vehicles" as well as in several other pending patent applications of the assignee.

Torsion damping apparatus of the type to which the present invention pertains are often used in motor vehicles to compensate for and absorb angular shocks, especially to compensate for fluctuations of torque between the crankshaft of the internal combustion engine and the input element of the variable-speed transmission. Such torsion damping apparatus normally comprise a composite flywheel having several coaxial flywheels which are rotatable relative to each other against the opposition of one or more yieldable dampers, one of which receives torque from the engine and the other of which transmits torque to the transmission by way of a friction clutch. The damper or dampers can include energy storing elements in the form of coil springs, other types of springs and/or friction generating units.

OBJECTS OF THE INVENTION

An object of the invention is to provide a novel and improved torsion damping apparatus which is simpler, more compact and less expensive but more reliable and more versatile than heretofore known torsion damping apparatus.

Another object of the invention is to provide a torsion damping apparatus which takes up little room between the crank-shaft of the engine and the friction clutch and input shaft of the variable-speed transmission in a motor vehicle.

A further object of the invention is to provide a torsion damping apparatus which can stand longer periods of use than conventional apparatus.

An additional object of the invention is to provide a torsion damping apparatus which comprises a small number of relatively simple and inexpensive parts, wherein a defective part can be readily replaced with little loss in time, and which can be furnished in any one of a practically infinite number of sizes and/or shapes to be ideally suited for installation in a particular motor vehicle.

Still another object of the invention is to provide a torsion damping apparatus wherein only those portions of various components which are actually subject to extensive wear must be made of highly wear-resistant material and which can be used as a superior substitute for heretofore known torsion damping apparatus in motor vehicles or for other purposes.

A further object of the invention is to provide novel and improved dampers for use in the above outlined torsion damping apparatus.

Another object of the invention is to provide novel and improved flywheels for use in the above outlined torsion damping apparatus.

An additional object of the invention is to provide the torsion damping apparatus with novel and improved means for establishing a torque transmitting connection between its dampers.

SUMMARY OF THE INVENTION

One feature of the present invention resides in the provision of an apparatus which can be used to compensate for angular shocks (including those which are caused by fluctuations of torque) of the type transmitted between an internal combustion engine and an input element of a variable-speed or change-speed transmission, particularly in a motor vehicle. The improved apparatus comprises at least two coaxial flywheels including a first flywheel which is connectable with the engine (e.g., with the crankshaft of the engine in a motor vehicle), and a second flywheel which is connectable with the input element of the variable-speed transmission by way of an engageable and disengageable friction clutch. The apparatus further comprises damper means serving to oppose rotation of the first and second flywheels relative to each other, and the damper means comprises an intermediate member (e.g., in the form of a flange) which is rotatable with reference to the first and second flywheels, and first and second dampers which are respectively provided between the intermediate member and the first and second flywheels. The radially outermost portion of the intermediate member is centered by one of the first and second flywheels.

The damper means preferably comprises energy storing means acting in the circumferential direction of the intermediate member. Alternatively, or in addition to the energy storing means, the damper means can comprise friction generating means.

The means for centering the intermediate member can be provided on the first flywheel; such centering means can be provided with an internal surface wich surrounds the peripheral surface of the radially outermost portion of the intermediate member. The internal surface can be provided on an axial projection of the one flywheel.

Another feature of the invention resides in the provision of an apparatus which comprises the aforediscussed first and second friction wheels and damper means including a first damper having springs and being resilient in the circumferential direction of the first and second flywheels, and a second damper which is disposed in series with the first damper and includes damping elements in frictional engagement with one another and serving to yield when the magnitude of torque between the first and second flywheels reaches a preselected value. The first damper is operative to oppose rotation of the first and second flywheels relative to each other through a first angle, the second damper is operative to oppose rotation of the first and second flywheels relative to each other through a second angle, and the damper means further comprises friction generating means which opposes rotation of the first and second flywheels relative to each other through the first and second angles. The friction generating means can form part of one of the dampers.

The second damper can comprise energy storing means which store energy during the last stage of rotation of the first and second flywheels relative to each other through the second angle. The second damper comprises input and output means which are turnable relative to each other through the second angle, and the energy storing means of the second damper include means for limiting the extent of angular movability of the input and output means relative to each other.

The second flywheel can comprise or can be non-rotatably connected with a disc, and the friction generating means can be disposed axially between the disc and the first flywheel. Such friction generating means can comprise a first ring which is non-rotatably connected with the second flywheel, a second ring between the first ring and the first flywheel, and an axially stressed diaphragm spring which biases the first ring against the second ring so that the latter bears against the first flywheel.

A further feature of the invention resides in the provision of an apparatus having at least two flywheels including a first flywheel which is connectable with the engine and a second flywheel which is connectable with the input element of the variable-speed transmission by way of an engage-able and disengageable friction clutch. The apparatus further comprises antifriction bearing means between the first and second flywheels, and damper means for opposing rotation of the first and second flywheels relative to each other. The damper means comprises energy storing means operating in the circum-ferential direction of the first and second flywheels, a disc-shaped member (such as the aforementioned disc) which is disposed between the first and second flywheels and is non-rotatably connected to the second flywheel, and friction generating means disposed between the disc-shaped member and the first flywheel. The friction generating means comprises a first ring, a second ring, a form-locking connection between the second ring and one of the first and second flywheels, and an axially stressed energy storing element (such as the aforedis-cussed diaphragm spring) bearing against the second ring and reacting against the one flywheel.

The energy storing element of the friction generating means can react against the the second flywheel, and the form-locking connection can comprise arms, prongs or like parts which couple the second ring to the second flywheel.

The bearing means between the first and second flywheels preferably comprises means for taking up the force which the energy styoring element of the friction generating means applies to the one flywheel.

The disc-shaped member is preferably dimensioned and mounted in such a way that a portion of this member maintains the bearing means in a predetermined axial position with reference to the second flywheel. To this end, the second flywheel can be provided with a shoulder, and the bearing means is then disposed between the aforementioned portion of the disc-shaped member and the shoulder. The just discussed portion of the disc-shaped member is prefer-ably located at the same distance from the axis of rotation of the second flywheel as the friction generating means.

The features of the aforediscussed apparatus can be used in combination or independently of each other. Thus, each embodiment of the apparatus can embody antifriction bearing means between the first and second flywheels and the damping means of the improved apparatus can include first and second dampers in series as well as friction generating means. Moreover the first flywheel can be provided with an axial projection which centers the aforediscussed intermediate member and/or the apparatus can employ damper means with friction generating means disposed at the aforediscussed radial distance from the axis of the second flywheel.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
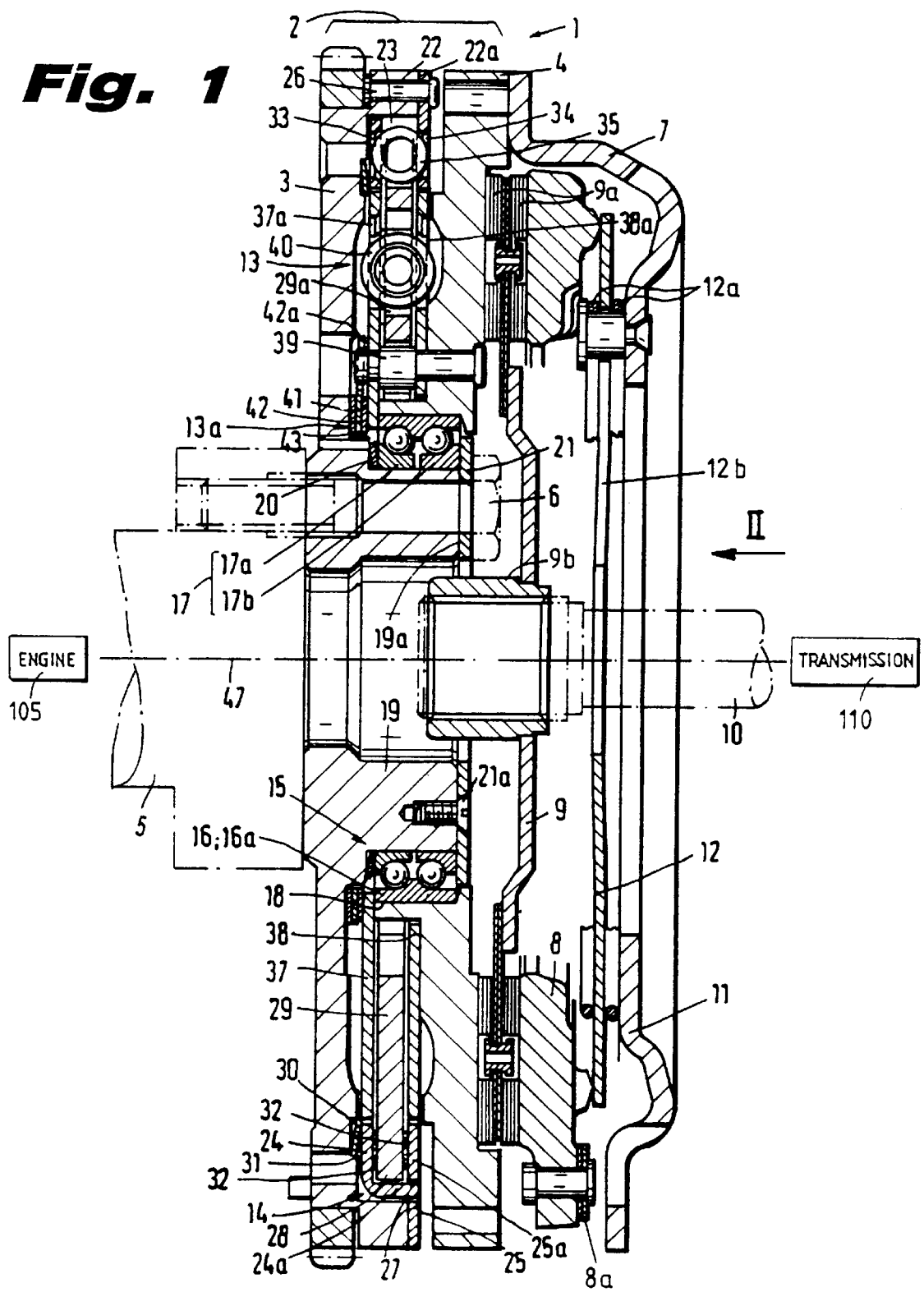
FIG. 1 is an axial sectional view of a torsion damping apparatus or assembly which embodies one form of the invention.
Figure 2:
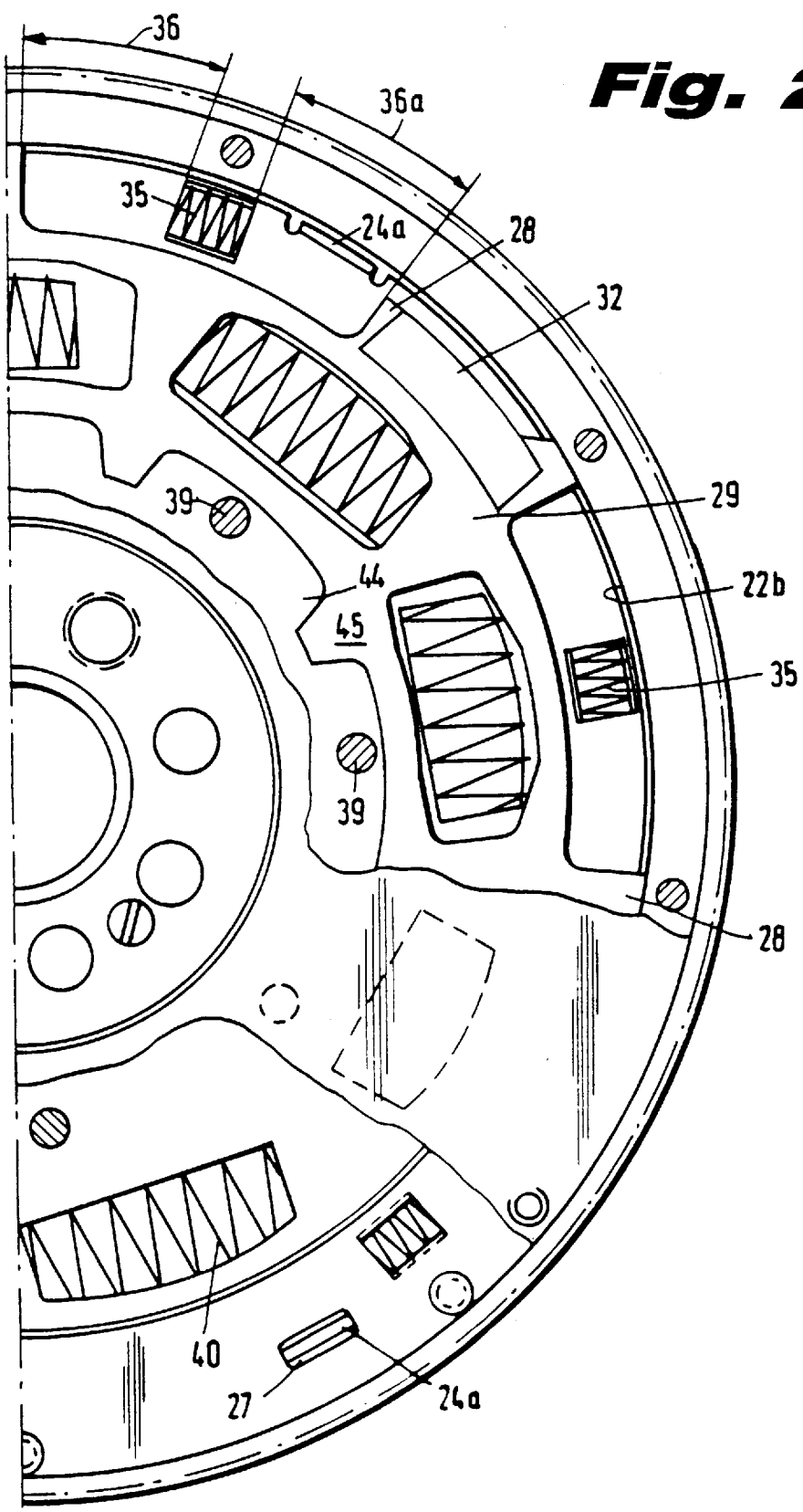
FIG. 2 is a fragmentary side elevational view as seen in the direction of arrow II in FIG. 1, with certain parts broken away.

The torsion damping assembly 1 which is shown in FIGS. 1 and 2 is installed between the crankshaft 5 of the internal combustion engine 105 and the input shaft 10 of the change-speed transmission 110 in a motor vehicle. The assembly 1 comprises a composite flywheel 2 which, in the embodiment of FIGS. 1 and 2, is assembled of two coaxial flywheels 3 and 4. The flywheel 3 is affixed to the crankshaft 5 by an annulus of bolts 6 or other suitable fasteners, and the flywheel 4 can transmit torque to the input shaft 10 of the transmission 110 through the medium of a friction clutch 7. The latter comprises a pressure plate 8 which is movable axially toward and away from the flywheel 4 and is non-rotatably but axially movably connected to the flywheel 4 and/or to the housing or cover 11 of the friction clutch 7 by a set of leaf springs 8a. The friction clutch 7 further comprises a diaphragm spring 12 which is tiltable between two ring-shaped wire-like seats 12a and whose outer marginal portion bears against the adjacent protuberances of the pressure plate 8 so as to urge the latter against the adjacent friction lining 9a of a clutch disc 9. The other lining 9a of the clutch disc 9 is then biased against and receives torque from the adjacent surface of the flywheel 4 which can be said to constitute an axially fixed pressure plate of the friction clutch 7. The clutch disc 9 is secured to a hub 9b which has internal splines receiving axially parallel external tongues of the input shaft 10 so that the latter is compelled to share all angular movements of the flywheel 4 when the clutch 7 is engaged. The means for disengaging the clutch 7 comprises an antifriction bearing (not shown) which can be moved axially into engagement with the inwardly extending prongs 12b of the diaphragm spring 12 so that the latter moves its outer marginal portion axially of and away from the flywheel 4 to thus interrupt the torque-transmitting connection between the flywheel 4 and the pressure plate 8 on the one hand and the friction linings 9a on the other hand.

The flywheels 3 and 4 of the composite flywheel 2 are rotatable within limits relative to each other, and such angular movements are opposed by two dampers including a first damper 13 and a second damper 14 which latter is mounted in series with the damper 13.

The torsion damping assembly 1 further comprises a bearing device 15 here shown as including an antifriction bearing 16 with two rows or annuli of spherical antifriction rolling elements. The one-piece outer race 16a of the bearing 16 is received in a centrally located recess 18 of the flywheel 4, and the two sections or halves 17a, 17b of the inner race 17 of the bearing 16 surround a centrally located protuberance 19 of the flywheel 3. The protuberance 19 extends into the recess 18 of the flywheel 4 and projects axially from that side of the major portion of the flywheel 3 which faces away from the crankshaft 5.

The sections 17a, 17b of the inner race 17 of the antifriction bearing 16 are biased axially toward each other by a prestressed energy storing device in the form of a diaphragm spring 20. The radially outermost portion of the diaphragm spring 20 reacts against a shoulder which is provided on the flywheel 3 and surrounds the protuberance 19, and the radially innermost portion of the spring 20 bears against the section 17a and urges it axially toward the section 17b whereby the latter abuts against a disc-shaped retainer 21 which is separably secured to the adjacent end face 19a of the protuberance 19 by a set of screws 21a or other suitable fastener means. As can be seen in FIG. 1, the diameter of the retainer 21 exceeds the diameter of the protuberance 19, and the radially outermost portion of the retainer 21 serves as a stop for the section 17b of the inner race 17. The diaphragm spring 20 ensures that the two annuli of rolling elements are received without play between the one-piece outer race 16a and the two-piece inner race 17 of the antifriction bearing 16 which constitutes a combined radial and thrust bearing for the flywheels 3 and 4.

In order to ensure that the rolling elements of the bearing 16 are received between the races 16a and 17 without any or without any appreciable play when the friction clutch 7 is in the process of being engaged or disengaged, the force of the spring 20 is greater than the force which is necessary to actuate the friction clutch. It has been found that the operation of the torsion damping assembly 1 is quite satisfactory if the force with which the spring 20 opposes a movement of the section 17a of the inner race 17 away from the section 17b is at least approximately twice the maximum force which is required to disengage the friction clutch 7.

The periphery of the flywheel 3 is provided with an axially extending ring-shaped centering projection or rim 22 which surrounds a chamber 23 for the first damper 13. A portion of the second damper 14 is also installed in the chamber 23 radially inwardly of the rim 22. The input element of the second damper 14 includes a group or set of two or more discs here shown as composed of two coaxial axially spaced-apart parallel discs 24, 25 which are non-rotatably affixed to the flywheel 3, i.e., which are arranged to share all angular movements of the crankshaft 5. The disc 25 is a ring-shaped washer which is fixedly secured to the end face 22a of the rim 22 by a set of rivets 26. The radially inwardly extending portion 25a of the disc 25 partially bounds the right-hand side of the chamber 23, as viewed in FIG. 1. The disc 24 is installed in the chamber 23 and has axially extending projections in the form of integral lugs 24a extending into apertures 27 of the disc 25 so that the latter holds the disc 24 against angular movement relative to the flywheel 3. The arrangement is such that the lugs 24a are movable axially in the respective apertures 27, i.e., the distance between the disc 25 and the main portion of the disc 24 is variable.

The space between the discs 24 and 25 of the second damper 14 receives a radially outermost portion including radially outwardly extending teeth or arms 28 of a flange or intermediate member 29, and the arms 28 are clamped between the adjacent portions of the discs 24, 25 by an energy storing device in the form of a diaphragm spring 30 reacting against the flywheel 3 and bearing against the disc 24 so that the latter is urged against the arms 28 and such arms are urged against the disc 25. As can be seen in FIG. 1, the radially outermost portion of the diaphragm spring 30 bears against the flywheel 3 in the chamber 23, and the radially innermost portion of the diaphragm spring 30 bears against the adjacent portion of the axially shiftable disc 24. The radially outermost portion of the diaphragm spring 30 is preferably slotted, i.e., the spring 30 can constitute a split ring, and such radially outermost portion of the spring 30 reacts against an annular centering shoulder 31 which is provided on the flywheel 3 in the chamber 23.

Friction generating linings in the form of arcuate segments 32 are bonded to both sides of each radially outwardly extending arm 28 to increase friction between the flange 29 and the discs 24, 25. The arms 28 of the flange 29 alternate (as viewed in the circumferential direction of the flywheels 3 and 4) with windows 33 and 34 which are respectively formed in the discs 24, 25. Each window 33 is in register with a window 34, and such pairs of registering windows receive energy storing elements in the form of coil springs 35. However, it is equally possible to employ energy storing elements in the form of springs made of hard rubber or the like. The coil springs 35 constitute abutments or stops for the radial arms 28 of the flange 29 and thus determine the extent of angular movability of the constituents of the second damper 14 relative to each other. The purpose of the spring 35 is to prevent strong impacts between the flange 29 and the discs 24, 25 of the damper 14 when the flange reaches the one or the other end position relative to the discs 24, 25. Each coil spring 35 has a central portion which is disposed between two neighboring radially outwardly extending arms 28 of the flange 29.

As can be seen in FIG. 2, which shows the damper 14 in an intermediate or neutral position, the energy storing coil springs 35 are separated from the nearest radial arms 28 of the flange 29 by clearances 36 and 36a which, together with the maximum extent of compression of the springs 35, determine the extent of angular movability between the input element (discs 24, 25) and the output element (flange 29) of the damper 14.

The flange 29 is concentric with the rim 22 and constitutes the input element of the first damper 13. The latter further comprises an output element in the form of two or more discs. The illustrated damper 13 has two discs 37, 38 which are disposed at the opposite sides of the flange 29 and are held at a fixed axial distance from each other by distancing elements 39 in the form of rivets which are anchored in the flywheel 4. The discs 37, 38 are disposed radially inwardly of the respective discs 24, 25 of the second damper 14. The disc 24 is at least substantially coplanar with the disc 37, and the disc 25 is at least substantially coplanar with the disc 38. The discs 37 and 38 are respectively provided with windows 37a, 38a which are located radially inwardly of the arms 28 of the flange 29 and register with windows 29a of the flange 29 to receive energy storing elements in the form of coil springs 40. These springs yieldably oppose angular movements of the flange 29 and the discs 37, 38 relative to each other.

The first damper 13 further includes a friction generating unit 13a which opposes each and every stage of angular movement of the flywheels 3 and 4 relative to each other. The friction generating unit 13a is installed between the disc 37 and the flywheel 3 and includes an energy storing member 41 in the form of a diaphragm spring installed between the disc 37 and a pressure transmitting ring 42. The latter urges a friction generating ring 43 against the friction wheel 3. The force which the diaphragm spring 41 applies to the disc 37 is taken up by the antifriction bearing 16. The pressure transmitting ring 42 has a slotted radially outermost portion 42a whose fingers alternate with the corresponding end portions of the distancing elements 39 to thus ensure that the ring 42 cannot rotate with reference to the flywheel 4.

The radially innermost portion of the flange 29 has arcuate recesses 44 (see FIG. 2) for portions of the distancing elements 39. The recesses 44 alternate with teeth 45 which cooperate with the distancing elements 39 to limit the extent of angular movability of the constituents of the first damper 13 relative to each other, i.e., the angular movability of the flange 29 and the flywheel 4 relative to one another. The distancing elements 39 actually cooperate with the surfaces surrounding the respective recesses 44 to determine the two end positions of the flywheel 4 and the flange 29 relative to one another.

The distribution of windows 37a, 38a in the discs 37, 38 and of the windows 29a in the flange 29 (as considered in the circumferential direction of these parts) is such that the coil springs 40 in the windows 29a, 37a, 38a impart to the damper 13 a multi-stage or stepped characteristic curve. In other words, the resistance which the coil springs 40 offer to angular displacement of the flange 29 and discs 37, 38 relative to each other varies stepwise in response to turning of the flange 29 with reference to the discs 37, 38 and/or vice versa.

The axis of the flange 29 is located on or close to the common axis 47 of the flywheels 3, 4 and bearing 16. This is ensured by the peripheral surfaces of the radially outwardly extending arms 28 which abut against the internal surface 22b of the rim 22 which forms a part of or is rigidly connected to the flywheel 3.

FIG. 2 shows the torsion damping assembly 1 in its neutral position. In response to a change of moment, the flywheel 3, the discs 24, 25 and the flange 29 turn relative to the flywheel 4 and discs 37, 38 to stress the coil springs 40 whereby the resistance to rotation of the flywheel 3 relative to the flywheel 4 increases stepwise due to differences in the dimensions of windows 37a, 38a in the discs 37, 38 and the windows 29a in the flange 29. Such angular displacement of the flywheel 3, discs 24, 25 and flange 29 relative to the flywheel 4 and discs 37, 38 continues until the torque which is transmitted by the coil springs 40 (which have undergone progressing compression and have stored additional energy) exceeds the friction moment which can be transmitted by the second damper 14. If the angular displacement of the flywheel 3 relative to the flywheel 4 continues in the same direction, the second damper 14 begins to slip so that the flange 29 ceases to turn relative to the flywheel 4 until the coil springs 35 reach and bear against the flanks of arms 28 on the flange 29. The arms 28 then effect a further angular displacement of the flange 29 (with the flywheel 3) relative to the flywheel 4 whereby the coil springs 35 store additional energy. The angular movement of the flywheel 3 and flange 29 relative to the flywheel 4 is terminated when the teeth 45 of the radially innermost portion of the flange 29 strike against the adjacent distancing elements 39.

As can be seen in FIG. 2, the configuration of arms 28 on the flange 29 is such that they engage the coil springs 35 for the purpose of determining the maximum extent of angular displacement of the input elements 24, 25 and output element 29 of the second damper 14 relative to each other. However, it is also within the purview of the invention to change the configuration of the arms 28 so that the extent of angular displacement of the discs 24, 25 relative to the flange 29 is determined by the arms 28 and/or by the lugs 24a of the disc 24. This can be accomplished by imparting to the arms 28 (with reference to the lugs 24a and coil springs 35) a shape which ensures that, as considered in the circumferential direction of the flywheels 3 and 4, the coil springs 35 first absorb the fluctuations of torque and thereupon cooperate with the lugs 24a to limit the extent of angular movement of the discs 24, 25 and flange 29 relative to each other. It is equally possible to dispense with the coil springs 35 and to rely exclusively on the lugs 24a as a means for limiting the extent of angular movement of the input and output elements of the second damper 14 relative to each other.

The means for limiting the extent of angular movability of the flange 29 and the discs 24, 25 relative to each other can include surfaces surrounding suitable openings (not specifically shown) in the flange. Such openings can receive the projections 24a of the disc 24 with a certain amount of play, as considered in the circumferential direction of the flywheels 3 and 4, and this play determines the extent to which the flange 29 can turn relative to the discs 24, 25 and/or vice versa. All that is necessary is to extend the projections 24a radially inwardly, as viewed in FIG. 2, so that they can be engaged by the adjacent arms 28 of the flange 29 when the latter turns relative to the discs 24 and 25. The openings of the flange 29 (for the projections 24a of the disc 24) can be radially outwardly open recesses or cutouts or closed slots whose length (as considered in the circumferential direction of the flywheel 3) determines the extent of angular movability of the flange 29 and discs 24, 25 relative to each other.

The torsion damping assembly 1 of FIGS. 1 and 2 can be modified in a number of ways, depending on the specific circumstances of its use. For example, the discs 24, 25 of the damper 14 can be caused to bear directly against the adjacent sides of teeth 28 on the flange 29 without the interposition of any friction generating or friction reducing linings. This depends on the desired magnitude of slip torque between the input and output elements of the damper 14. However, and as a rule, the damper 14 will comprise friction generating linings between the flange 29 and at least one of the discs 24, 25. The composition of these linings will determine the magnitude of slip torque, and such torque also depends on the selected bias of the diaphragm spring 30.

Furthermore, the disc 25 which is secured to the rim 22 of the flywheel 3 by the rivets 26 can be provided with axially parallel projections or lugs which extend into suitable apertures of the disc 24. Such projections can be provided in addition to or in lieu of the projections 24a. The projections of the disc 24 and/or 25 may but need not be integral parts of the respective disc; for example, they may be welded, riveted or otherwise affixed to the corresponding disc.

Still further, the positions of the dampers 13 and 14 can be reversed, i.e., the discs 24, 25 can be disposed radially inwardly of the discs 37, 38. Also, the discs 24, 25 can be secured to the flywheel 4, and the discs 37, 38 are then secured to the flywheel 3.

As already mentioned above, the projections 24a can be caused to extend radially inwardly beyond the positions which are shown in FIG. 2 so that they cooperate with the arms 28 of the flange 29 to determine the maximum extent of angular movability of the discs 24, 25 and the flange 29 relative to each other. However, and especially if the improved torsion damping assembly 1 already includes other means for limiting the extent of such angular movability of the parts 24, 25 and 29 relative to each other (for example, the arms 28 of the flange 29 and the coil springs 35 in the windows 33, 34 of the discs 24, 25), the projections 24a are preferably disposed radially outwardly of the arms 28 so that they can bypass the flange 29 or vice versa when the discs 24, 25 and the flange 29 are caused to turn relative to each other about the common axis 47 of the flywheels 3 and 4.

The bias of the diaphragm spring 30 can be selected with a view to ensure the generation of desirable slip torque between the discs 24, 25 and the flange 29. It is also possible to provide means for adjusting the bias of the diaphragm spring 30 so as to vary the slip torque until it assumes an optimum value.

The outermost marginal portion of the diaphragm spring 30 is preferably formed with radial slots or cutouts. Alternatively, the diaphragm spring 30 can constitute a split ring. The just described types of diaphragm springs are preferred at this time because they can be mass-produced at a reasonable cost by rolling a strip of metallic material. As used in this description and in the claims, the term "diaphragm spring"0 is intended to denote a conventional circumferentially complete diaphragm spring, a diaphragm spring which constitutes a split ring, a diaphragm spring which has radially extending slots or cutouts in its radially outermost portion or any equivalent energy storing element. The utilization of diaphragm springs in the form of split rings is desirable and advantageous on the additional ground that such split rings can be readily installed within the confines of the centering shoulder 31 in the flywheels 3.

The coil springs 35 can be dimensioned and the length of the windows 33, 34 in the discs 24, 25 can be selected in such a way that the coil springs undergo at least some deformation and store additional energy in response to each and every stage of angular-movement of the flange 29 and discs 24, 25 relative to each other. Alternatively, and as actually shown in FIG. 2, the arms 28 of the flange 29 begin to compress the springs 35 only during the last stage of angular movability of the flange 29 and the discs 24, 25 relative to each other. In other words, the assembly 1 is constructed and operates in such a way that the discs 24, 25 and the flange 29 can turn relative to each other through a first angle without any deformation of the coil springs 35 (or without any additional deformation if the coil springs 35 are installed in prestressed condition) and thereupon through a second angle with attendant progressively increasing deformation of the coil spring 35 until the convolutions of each spring 35 (or at least one of these springs) are immediately adjacent to each other and the fully compressed spring or springs 35 then constitute stops which prevent any additional angular movements of the discs 24, 25 and the flange 29 relative to each other. As shown in FIG. 2, the dimensions of the coil springs 35 and of the spaces or openings between the arms 28 of the flange 29 can be selected in such a way that the coil springs 35 undergo compression as a result of engagement with the adjacent arms 28 only during a relatively small (final) stage of angular displacement of the flange 29 and the discs 24, 25 relative to each other. The springs 35 prevent or reduce the likelihood of damage to the parts of the damper 14 because they constitute yieldable cushions which become effective not later than shortly before the flange 29 and the discs 24, 25 reach the limit of their angular movement relative to each other. This also entails a pronounced reduction of noise.

In the embodiment of FIGS. 1 and 2, the rim 22 of the flywheel 3 does not extend axially beyond the entire second damper 14 because the disc 25 of this damper is riveted to the end face 22a of the rim. However, and as shown in FIGS. 3–5 and 9, the rim of the flywheel which receives torque from the crankshaft of the engine can extend axially beyond the entire second damper so that both dampers are disposed entirely within the confines of the rim.

Figure 3:
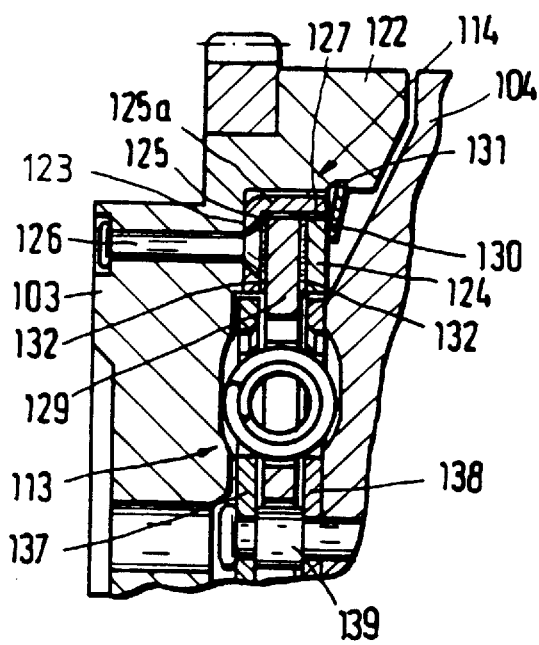
FIG. 3 is a fragmentary axial sectional view of a second torsion damping assembly employing a modified damper.

FIG. 3 shows a portion of a modified torsion damping assembly wherein the flywheel 103 is rigidly connected to the disc 125 by rivets 126 or analogous fasteners. The radially outermost portion of the disc 125 has axially extending projections or lugs 125a received in apertures 127 which are provided in the disc 124. The disc 124 is adjacent to the flywheel 104 and the apertures 127 are provided close to its peripheral surface. The width of the apertures 127 (as considered in the circumferential direction of the flywheels 103 and 104), is such that the discs 124 and 125 cannot rotate relative to each other. However, the disc 124 is movable axially toward and away from the disc 125. The discs 124, 125 constitute the composite input element of the second damper 114 whose output element is a flange 129 which is disposed between the discs 124, 125. The flange 129 carries two ring-shaped (one piece or composite) friction generating linings 132 which are in contact with the adjacent discs 124, 125.

The flange 129 constitutes the input element of the first damper 113 whose output element includes two discs 137, 138 which are fixedly secured to each other by distancing elements 139 in the form of rivets anchored in the flywheel 104. The dampers 113 and 114 are installed in a chamber 123 which is provided radially inwardly of the axially extending ring-shaped rim 122 of the flywheel 103. The internal surface of the rim 122 is formed with a groove 131 which receives the radially outermost portion of a diaphragm spring 130 so that the latter is held against axial and radial movement relative to the rim 122. The radially innermost portion of the diaphragm spring 131 bears against the adjacent portion of the disc 124 and urges the latter axially against the corresponding friction generating lining 132 of the flange 129 whereby the other friction generating lining 132 of the flange 129 bears against the axially fixed disc 125 on the flywheel 103. In order to facilitate the installation of the diaphragm spring 130 in the groove 131, the radially outermost portion of the spring 130 is preferably slotted to allow for a reduction of its outer diameter prior to insertion into the groove 131. The slip torque of the second damper 114 is determined by the bias of the diaphragm spring 130 and by the friction coefficients of friction generating linings 132.

All remaining parts of the torsion damping assembly which embodies the structure of FIG. 3 are or can be identical with those of the assembly 1 which is shown in FIGS. 1 and 2. It will be seen that, in contrast to the second damper 14 of FIGS. 1 and 2, the damper 114 of FIG. 3 has a disc 124 which does not have any axially extending lugs and which is axially movably mounted on the flywheel 104 (corresponding to the flywheel 4 of FIGS. 1–2). The lugs (125a) are provided on the disc 125 which is riveted to the flywheel 103 (corresponding to the flywheel 3 of FIGS. 1 and 2).

Figure 4:
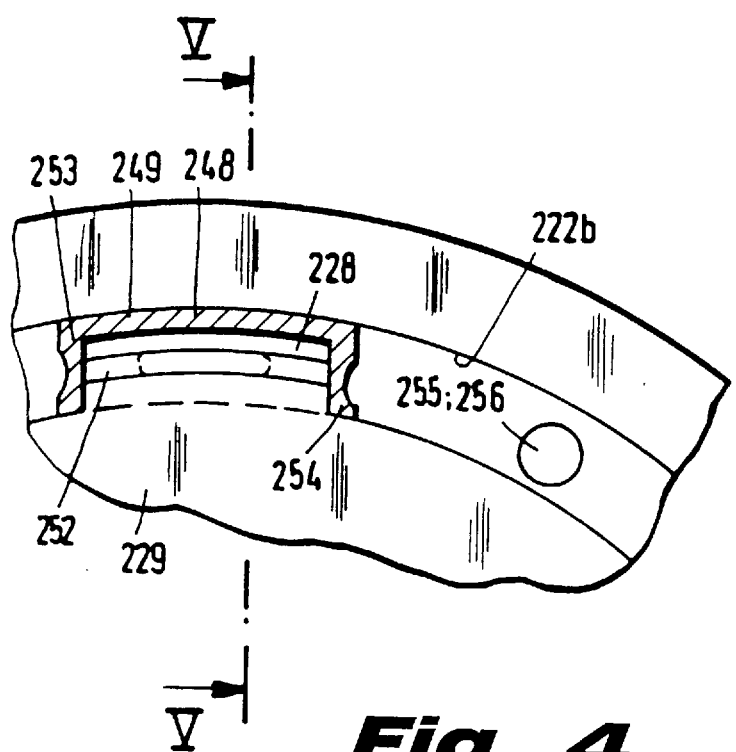
FIG. 4 is a fragmentary partly side elevational and partly sectional view of a third torsion damping assembly.
Figure 5:
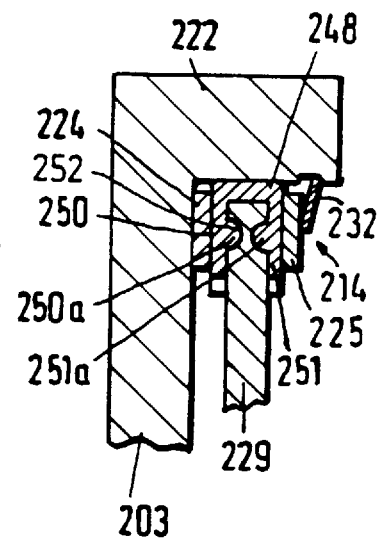
FIG. 5 is a sectional view as seen in the direction of-arrows from the line V—V of FIG. 4.

FIGS. 4 and 5 show a portion of a third torsion damping assembly wherein all such parts which are identical with or clearly analogous to the corresponding parts of the assembly 1 of FIGS. 1 and 2 are denoted by similar reference characters plus 200. The second damper 214 of FIGS. 4 and 5 is adjacent to the internal surface 222b of the peripheral rim 222 on the flywheel 203. The flange 229 has radially outwardly extending arms 228 which carry friction generating slidable extensions 248 adjacent to the internal surface 222b and serving to center the flange 229 relative to the flywheel 203 and the other flywheel (not shown). The extensions 248 constitute the radially outermost portions or webs of substantially U-shaped caps or hoods 249 which are slipped onto the arms 228 and further include sidewalls 250, 251 flanking the respective arms 228. Each sidewall 250 is disposed between the respective arm 228 and the disc 224, and each sidewall 251 is disposed between the respective arm 228 and the disc 225. The discs 224, 225 constitute the input element of the second damper 214. A diaphragm spring 232 is mounted in an internal groove of the rim 222 in the same way as described for the diaphragm spring 130 of FIG. 3 and serves to bias the disc 225 against the sidewall 251 and to thereby bias the sidewall 250 against the disc 224 so as to generate the required moment of friction.

In order to prevent separation of the caps 249 from the respective arms 228 under the action of centrifugal force, at least one of the sidewalls 250, 251 is provided with detent means which prevents its movement radially outwardly (although such movement is or can be prevented by the rim 222). In the embodiment of FIGS. 4 and 5, each of the sidewalls 250, 251 is provided with male detent means in the form of a circumferentially extending bead or male detent member 250a, 251a which is held by snap action in a complementary socket 252 at the corresponding side of the respective arm 228. In order to facilitate the slipping of the caps 249 onto the respective arms 228, the length of each male detent member 250a, 251a (as considered in the circumferential direction of the flange 229) is only a small fraction of the length of the respective socket 252. The male detent members 250a, 251a snap into the respective sockets 252 due to innate elasticity of the caps 249. Each socket 252 extends along the full length of the corresponding arm 228, as considered in the circumferential direction of the flange 229. The portions 253, 254 of each cap 249 constitute elastic and shock-absorbent parts of such caps which cooperate with abutments or stops 255 on the flywheel 203 to limit the extent of angular displacement of the input and output elements of the second damper 214 relative to each other. The abutments 255 are secured to the flywheel 203 in such a way that they share its angular movements relative to the other flywheel. Each of the abutments 255 can constitute a pin or bolt which is anchored in the flywheel 203 and extends into registering bores or holes 256 of the discs 224, 225 to hold such discs against angular movement with reference to the flywheel 203.

An advantage of the extensions 248 is that they reduce the likelihood of interference with the operation of the first damper as a result of undesirable friction between certain parts of the torsion damping assembly. To this end, the extensions 248 can be made of a friction reducing material so that they can adequately center the flange 229 within the rim 222 but are in minimal frictional engagement with the flywheel 203. Elimination of the likelihood of interference with proper operation of the first damper is particularly desirable and advantageous during that stage or those stages of the operation of the first damper (i.e., during that stage or those stages of angular movement of the flywheels relative to each other) when the torque which is being transmitted between the two flywheels is relatively small.

The extensions 248 can be made of a first (friction reducing) material and the sidewalls 250 and 251 can be made of a second (friction generating) material.

Figure 6:
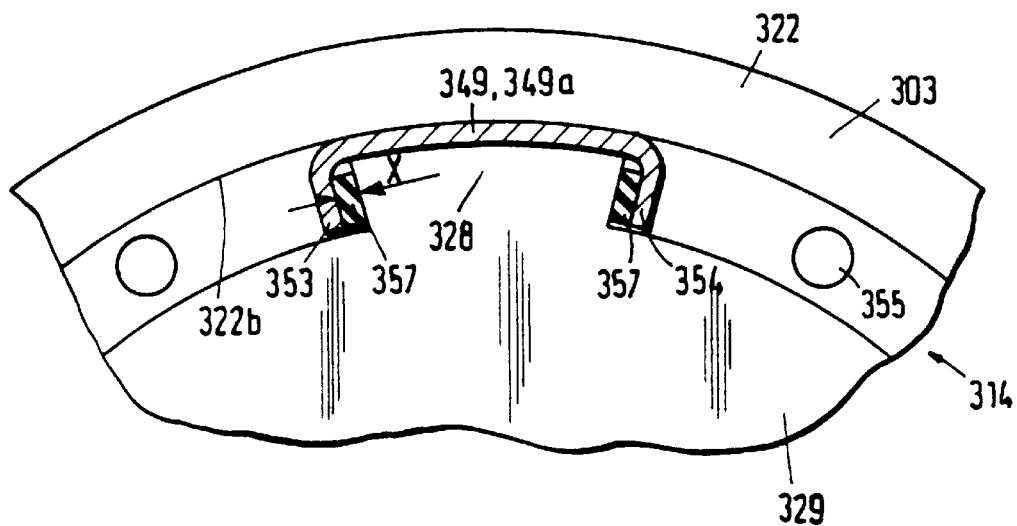
FIG. 6 is a fragmentary partly side elevational and partly sectional view of a fourth torsion damping assembly.

FIG. 6 shows a portion of a fourth torsion damping assembly wherein the flange 329 is centered in the chamber of the flywheel 303 in a different way. The arms 328 of the flange 329 are provided with yoke-like hysteresis centering mechanism including elements or shoes 349 having end walls or components 353, 354 which overlie the flanks of the respective arms 328 (i.e., those end faces of the arms 328 which are disposed in planes extending radially of the flywheel 303 and including or parallel with the common axis of the flywheels). The end walls 353, 354 cooperate with pin- or bolt-shaped abutments or stops 355 which are provided on the flywheel 303 to limit the extent of angular movability of the flange 329 relative to this flywheel. The abutments 355 preferably extend through registering holes of the two discs (corresponding to the discs 224, 225 of FIGS. 4 and 5) of the second damper 314. Such discs are disposed at the opposite sides of the flange 329. The end walls 353, 354 extend radially inwardly from the longitudinal end portions of a web 349a which constitutes the median part of the respective shoe 349 of the hystereris mechanism and is immediately adjacent to the internal surface 322b of the rim 322 on the flywheel 303. The distance between the end walls 353, 354 of each shoe 349 exceeds the length of the respective arm 328 (as considered in the circumferential direction of the flywheel 303) by the value 2X which suffices to establish clearances which allow for the insertion of energy storing devices in the form of elastically deformable pads 357 made of hard rubber or a material exhibiting similar elastomeric properties. Each pad 357 is inserted between the inner side of the end wall 353 or 354 and the respective end face of the corresponding arm 328. The purpose of the pads 357 is to absorb the shocks when the end walls 353, 354 strike against the adjacent abutments or stops 355 and/or vice versa as well as to reduce noise. Each of the shoes 349 can be made of a metallic material or of any other material which exhibits the required frictional and sliding properties.

The stops 355 can be replaced with stops which extend radially inwardly from the rim 322 of the flywheel 303 or with energy storing coil springs or blocks corresponding to the energy storing elements 35 of FIG. 2. For example, the discs (not shown) of the damper 314 can be provided with registering windows for coil springs which replace the stops 355 and cooperate with the end walls 354 of the adjacent shoes 349 to limit the extent of angular movability of the flange 329 and the discs of the damper 314 relative to each other as well as to minimize noise on impact of the end walls 354 against such coil springs and/or vice versa. The energy storing devices 357 are optional if the stops 355 are replaced with coil springs or with blocks of elastomeric material.

Figure 7:
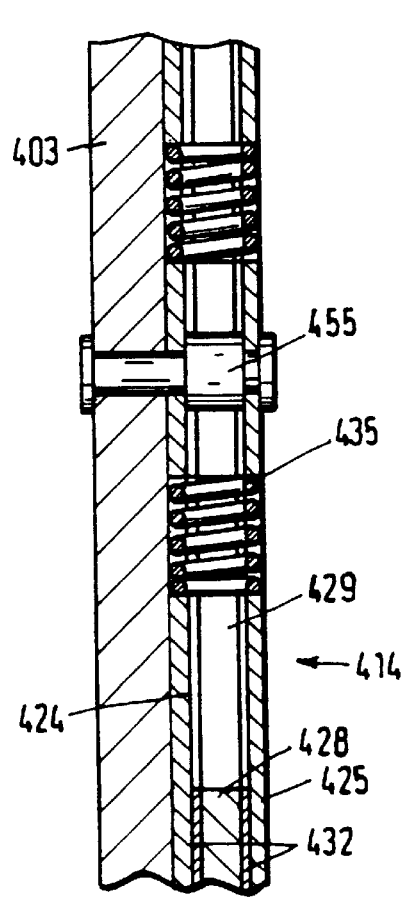
FIG. 7 is a fragmentary sectional view of a fifth torsion damping assembly.
Figure 8:
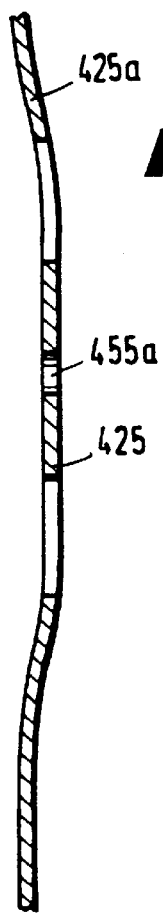
FIG. 8 illustrates in section a portion of a disc in unstressed condition prior to insertion into the assembly of FIG. 7.

FIGS. 7 and 8 show a portion of an additional torsion damping assembly wherein the second damper 414 comprises two discs 424, 425 which are non-rotatably connected to each other and to the flywheel 403 by distancing elements in the form of pins, bolts or rivets 455. The discs 424, 425 are disposed at the opposite sides of the radially outwardly extending arms 428 of a flange 429 and each side of each arm 428 carries a friction-generating lining 432 corresponding to the linings 132 shown in FIG. 3.

As can be seen in FIG. 8, the disc 425 has undulate portions (indicated at 425a) at both sides of each hole or bore 455a for one of the distancing elements 455 (as considered in the circumferential direction of the disc 425). When the disc 425 is properly mounted in the torsion damping assembly, the undulate portions 425a are flattened (i.e., the disc 425 is installed in prestressed condition, as considered in the axial direction of the discs 424, 425). This can be readily seen in FIG. 7 wherein the the disc 425 is flat, i.e., its plane is disposed at right angles to the axis of the flywheel 403 and is parallel to the plane of the flat disc 424. The prestressed disc 425 biases the arms 428 of the flange 429 against the disc 424 to generate the required moment of friction when the flange 429 turns relative to the discs 424, 425 and/or vice versa. The means for limiting the extent of angular movement of the flange 429 relative to the discs 424, 425 comprises energy storing elements in the form of coil springs 435 which are inserted into registering windows of the discs 424, 425 substantially in the same way as described for the coil springs 35 of FIGS. 1 and 2. Each coil spring 435 is flanked by two arms 428, and the flange 429 ceases to turn relative to the discs 424, 425 when each of the coil springs 435 is engaged and compressed by one of the adjacent arms 428.

The utilization of an undulate disc 425 which is made of a suitable elastomeric material (such as spring steel) renders it possible to dispense with discrete biasing means (such as the diaphragm spring 30 of FIG. 1) for urging the discs 424, 425 axially against the respective sides of the arms 428.

The undulate portions 425a alternate with those (second) portions of the disc 425 which are held at a fixed distance from the disc 424 (and also at a given fixed distance from the flywheel 403) by the corresponding distancing elements 455.

Figure 10:
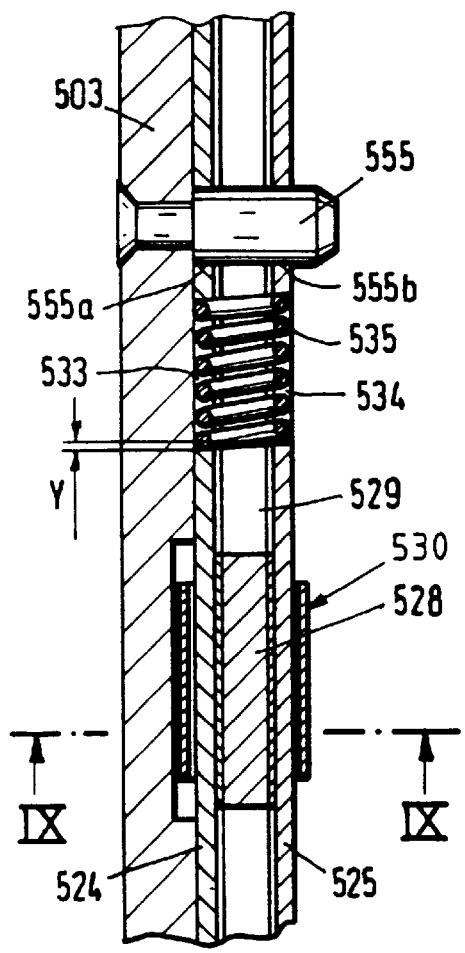
FIG. 10 is another sectional view of the sixth torsion damping assembly.
Figure 9:
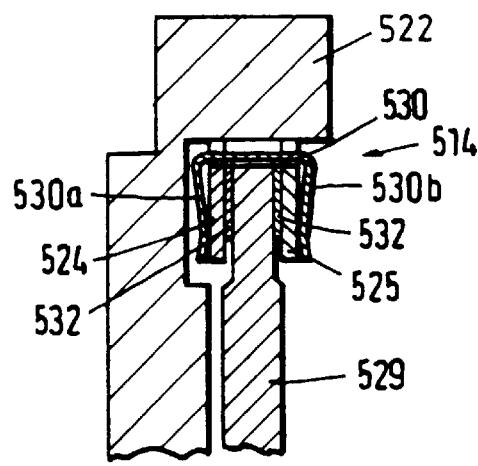
FIG. 9 is a fragmentary axial sectional view of a sixth torsion damping assembly, the section being taken in the direction of arrows as seen from the line IX—IX in FIG. 10.

FIGS. 9 and 10 show a portion of still another torsion damping assembly wherein the damper 514 comprises two discs 524, 525 which are disposed at the opposite sides of the radially outwardly extending arms 528 of a flange 529. The means for biasing the discs 524, 525 against the adjacent friction generating linings 532 at the corresponding sides of the arms 528 comprises a set of U-shaped elastic clamps 530 which are spaced apart from each other, as considered in the circumferential direction of the flywheel 503. Each of the U-shaped clamps 530 has a web which is inwardly adjacent to the rim 522 of the flywheel 503 and two sidewalls or cheeks 530a and 530b which are respectively adjacent to the outer sides of the discs 524 and 525 and urge such discs toward each other, i.e., toward the corresponding friction generating linings 532 to generate the required moment of friction. The means for holding the discs 524, 525 against rotation relative to each other and relative to the flywheel 503 comprises distancing elements 555 in the form of rivets, studs, bolts or pins which are anchored in the flywheel 503 and extend into suitable complementary holes or bores 555a, 555b of the discs 524, 525.

The discs 524, 525 are respectively formed with windows 533, 534 for energy storing elements in the form of coil springs 535 which limit the extent of angular movability of the flange 329 and discs 524, 525 (i.e., of the output and input elements of the damper 514) relative to each other. Each of the coil springs 535 is compressed by one of the neighboring arms 528 when the angular movement of the flange 529 relative to the discs 524, 525 or vice versa is to be terminated.

As can be seen in FIG. 10, the windows 533 of the disc 524 in assembled condition of the torsion damping assembly including the damper 514 are angularly offset-relative to the windows 534 of the disc 525 by a distance Y to thus ensure a non-symmetrical or one-sided stressing of the coil springs 535. Such one-sided stressing of the coil springs 535 is desirable and advantageous because it ensures that the coil springs 535 eliminate eventual play between the distancing elements 555 and the surfaces surrounding the respective holes 555a, 555b in the discs 524 and 525 by urging the discs 524, 525 to turn relative to each other about the common axis of the flywheels. Such elimination of play between the distancing elements 555 and the discs 524, 525 has been found to enhance the damping action of the damper 514 to a considerable extent, i.e., the damper 514 is effective as soon as and whenever the flange 529 changes its angular position relative to the discs 524, 525 and/or vice versa, even to a minute extent. Furthermore, such elimination of play between the distancing elements 555 on the one hand and the discs 524, 525 on the other hand reduces the likelihood of noise generation when the damping assembly employing the structure of FIGS. 9 and 10 is in actual use.

Figure 11:
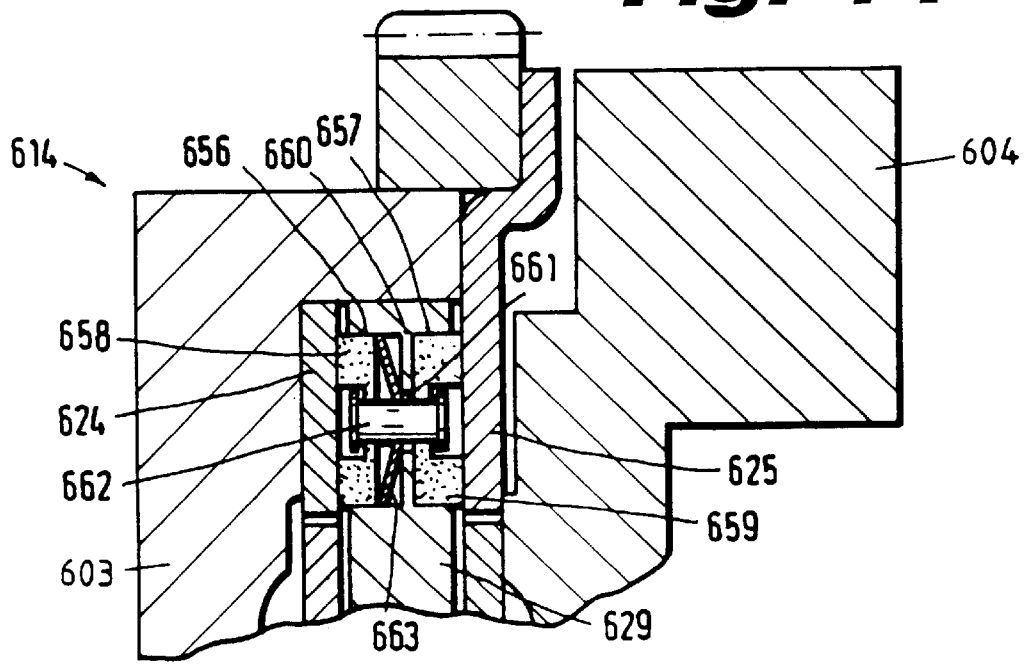
FIG. 11 is a fragmentary axial sectional view of still another torsion damping assembly.

Referring now to FIG. 11, there is shown a portion of an additional torsion damping assembly including a damper 614 whose output element is a torque transmitting component or flange 629 disposed between the discs 624, 625 of the composite input element. Each side of the flange 629 is provided with an annulus of blind bores or holes (shown at 656 and 657), and these blind bores respectively receive round plug-shaped friction generating inserts or members in the form of pads 658, 659. The partition 660 between each pair of registering blind bores 656, 657 has a preferably centrally located passage 661 for a portion of a connector 662 in the form of a rivet serving to couple the corresponding plugs 658, 659 to each other with limited freedom of movement in parallelism with the common axis of the flywheels 603, 604 and to retain such pads in their blind bores. The heads of the rivets 662 are recessed into the corresponding pads 658, 659 in a manner clearly shown in FIG. 11 so that they cannot come into contact with the respective discs 624, 625. The shank of each rivet 662 is surrounded by an energy storing diaphragm spring 663 which is installed in prestressed condition and constitutes a means for biasing the adjacent pad 658 against the disc 624 as well as for simultaneously biasing the adjacent pad 659 against the disc 625. The radially innermost portion of each diaphragm spring 663 is slidable along the shank of the respective rivet 662. The combined bias of all diaphragm springs 663 suffices to ensure the generation of required friction between the composite friction generating inserts constituted by the pads 658, 659 on the one hand and the corresponding discs 624, 625 on the other hand.

The distance between the heads of each rivet 662 is selected in such a way that each of these rivets allows for a certain axial shifting of the corresponding pads 658, 659 away from each other (i.e., in parallelism with the common axis of the flywheels 603 and 604) against the opposition of the corresponding diaphragm spring 663. This compensates for wear upon the pads 658, 659. Moreover, such limited movability of the registering pairs of pads 658, 659 axially and away from each other facilitates the installation of the damper 614 in the torsion damping assembly because the diaphragm springs 663 can ensure that the corresponding rivets 662 and the corresponding pairs of pads 658, 659 are held in optimal axial positions relative to the flange 629. When the damper 614 is properly installed between the flywheels 603 and 604, the diaphragm springs 663 are maintained in stressed condition to thus ensure that the exposed end faces of the pads 658, 659 engage the discs 624, 625 with a required force, i.e., that the damper 614 offers the desired resistance to angular movements of the flywheels 603 and 604 relative to each other.

FIG. 11 further shows that the thickness of the pad 659 exceeds the depth of the respective blind bore or hole 657 so that the inner end face of the pad 659 bears directly against the partition 660. On the other hand, the axial length or thickness of the pad 658 is less than the depth of the respective blind bore or hole 656 so as to provide room for the prestressed diaphragm spring 663 which reacts against the partition 660 and bears against the inner end face of the respective pad 658 in order to urge the outer end face of the pad 658 against the disc 624. The pad 658 can be fully received in its blind bore or hole 656 in response to requisite axial stressing of the diaphragm spring 663.

The pad 658 can be replaced with a pad which bears against the partition 660 and extends outwardly beyond its blind hole or bore 656 the same as the pad 659, or the pads 658, 659 can be replaced with a single insert which extends in at least substantial parallelism with the common axis of the flywheels 603, 604 beyond both sides of the flange 629 and into requisite engagement with the adjacent sides of the discs 624 and 625. Each single insert is received in a bore or hole which extends all the way between the two sides of the flange 629. The illustrated structure is preferred at this time because each diaphragm spring 663 can compensate for wear upon the respective pads 658 and 659. The flange 629 can have some freedom of movement between the discs 624, 625 to thus ensure that each pad 659 remains in engagement with the disc 625 in spite of progressing wear upon the pad 689. Alternatively, the flange 629 can be mounted in such a way that its central portion remains in a fixed axial position but that its outer portion (which is formed with the annuli of blind holes 656, 657) can be flexed in the axial direction of the flywheels 603 and 604.

The surfaces surrounding the holes 656 and 657 (especially the surfaces surrounding the holes 656) limit the extent of movability of the respective pads in the circumferential as well as in the radial direction of the flange 629. The same holds true if each pair of pads 658, 659 is replaced with a single pad whose length (as measured in the axial direction of the flywheels 603, 604) exceeds the thickness of the flange 629 and which is movable only axially in its bore or hole, i.e., the surface surrounding each such hole or bore confines the respective single pad to movements in parallelism with the common axis of the flywheels.

The connectors 662 are not absolutely necessary, even if the flange 629 carries pairs of coaxial pads 658, 659. The primary purpose of the connectors 662 is to facilitate and simplify the installation of the flange 629 between the discs 624 and 625 of the damper 614. As mentioned above, the connectors 662 allow for limited axial movements of the respective pads 658 away from the associated (coaxial) pads 659 under the action of the corresponding diaphragm springs 663 as well as for movements of the respective pads 658 toward the associated pads 659 against the opposition of the corresponding springs 663 and to the extent permitted by the minimum thickness of the springs 663 and by the respective partitions 660.

Figure 12:
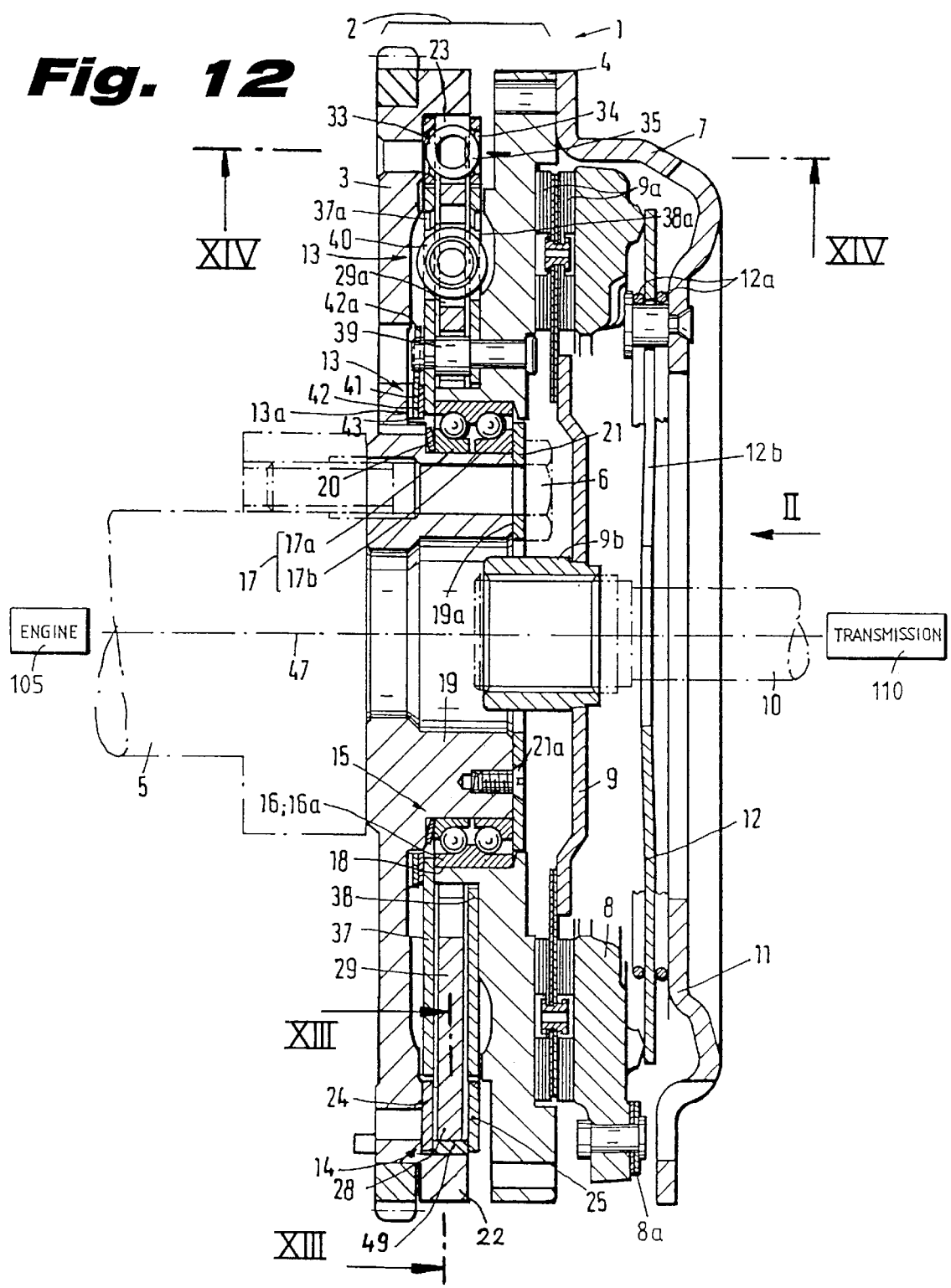
FIG. 12 is an axial sectional view of a torsion damping assembly witch constitutes a further modification of the assembly shown in FIG. 1.

FIG. 12 shows an assembly corresponding to that of FIG. 1 but with the features shown in FIGS. 4 and 5 incorporated therein. Thus, the hood 49 (shown in the lower left-hand portion of FIG. 12) is in frictional engagement with the discs 24, 25 (reference may be had to frictional engagement between the hood 248 and the discs 224, 225 shown in FIG. 5). When the energy storing elements 35 shown in FIG. 12 are stressed in response to angular displacement of the flywheels 3, 4 relative to each other, the hood 49 of FIG. 12 is in frictional sliding engagement with the adjacent surfaces of the discs 24, 25, i.e., the hysteresis mechanism or friction generating means including the hood is located radially outwardly of and operates in parallel with the springs 35.

Figure 13:
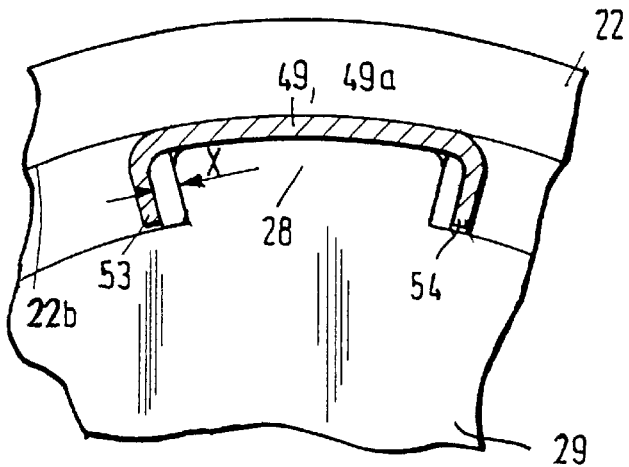
FIG. 13 is a fragmentary partly side elevational and partly sectional view of a torsion damping assembly constituting a modification of the assembly shown in FIG. 6.
Figure 14:
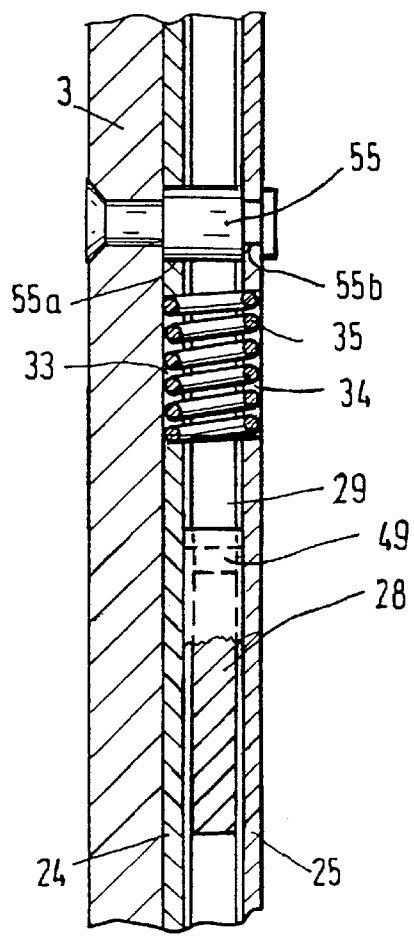
FIG. 14 is a sectional view of a torsion damping assembly constitution a modification of the assembly shown in FIG. 10.
Figure 15:
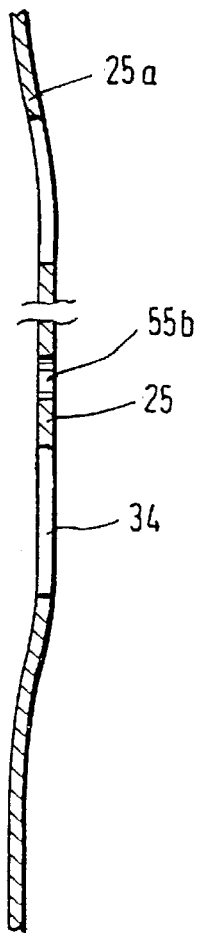
FIG. 15 is a sectional view of a disc constituting a modification of the disc shown in FIG. 8.

FIGS. 13, 14 and 15 respectively illustrate features similar to those shown in FIGS. 6, 10 and 8, respectively. The abutments constituted by the edge portions of the discs 24, 25 are engageable by the springs 35 when such springs are stressed by the arms of the intermediate member or flange 29, and hence also by the radial portion 53 or 54 of the hood or cap 49. The radial portion 53 or 54 of the hood or cap 49 is then clamped between an arm 28 and an end convolution of the adjacent spring 35.

For the convenience of comparison, FIG. 12 is provided with reference numerals corresponding (wherever possible) to those employed in FIG. 1. The structure of FIG. 13 is analogous to that shown in FIG. 6 except that it omits the pads 357 of FIG. 6. FIG. 14 is provided with reference numerals corresponding to those shown in FIG. 10 (minus 500). FIG. 15 is provided with reference numerals corresponding to those shown in FIG. 8 (minus 400), and FIG. 15 further adds the reference numerals 34 corresponding to the numeral 534 shown in FIG. 10 and denoting the window for the spring 35 of FIG. 14.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for compensating for angular shocks, comprising a first rotary flywheel connectable with a combustion engine of a motor vehicle; a second rotary flywheel connectable with an input element of a transmission by way of a friction clutch, said flywheels being angularly movable relative to each other; and damper means for opposing angular movements of said flywheels relative to each other, said damper means including energy storing means acting in a circumferential direction of said flywheels, a hysteresis mechanism acting in parallel with said energy storing means, and a member arranged to operate said hysteresis mechanism and being non-rotatably connected with one of said flywheels, said member having portions extending substantially radially of said one flywheel when said member is connected to said one flywheel and said member defining with said hysteresis mechanism clearances extending in said circumferential direction.

2. The apparatus of claim 1, wherein said input element includes a rotary shaft of said transmission.

3. The apparatus of claim 1, wherein said member includes a part which is radially spaced apart from a rotational axis of said one flywheel, said hysteresis mechanism being adjacent said part of said member.

4. The apparatus of claim 1, wherein said hysteresis mechanism includes elements which overlie said portions of said member, said portions of said member and said elements being movable relative to each other in said circumferential direction to an extent determined by said clearances.

5. The apparatus of claim 1, wherein said said member has radially outermost portions and said portions extending substantially radially of said one flywheel form part of or constitute said radially outermost portions of said member.

6. The apparatus of claim 1, wherein said energy storing means is located at a first radial distance from a rotational axis of said one flywheel and said hysteresis mechanism is disposed at a second radial distance from said axis, said second radial distance being greater than said first radial distance.

7. The apparatus of claim 1, further comprising means for limiting the angular movability of said flywheels relative to each other, said limiting means including abutments cooperating with said hysteresis mechanism.

8. The apparatus of claim 7, wherein said hysteresis mechanism includes components which are spaced apart from each other in said circumferential direction, which extend substantially radially of an axis of said one flywheel, which overlie said portions of said member, and which cooperate with said abutments to limit the extent of angular movability of said flywheels relative to each other.

9. The apparatus of claim 1, wherein said damper means comprises a first damper including said energy storing means and a second damper in series with said first damper and including second energy storing means.

10. Apparatus for compensating for angular shocks, comprising a first rotary flywheel connectable with a combustion engine of a motor vehicle; a second rotary flywheel connectable with an input element of a transmission by way of a friction clutch, said flywheels being angularly movable relative to each other; and damper means for opposing angular movements of said flywheels relative to each other, said damper means including energy storing means acting in a circumferential direction of said flywheels, a hysteresis mechanism acting in parallel with said energy storing means, and a member arranged to operate said hysteresis mechanism and being non-rotatably connected with one of said flywheels, said member having portions extending substantially radially of said one flywheel when said member is connected with said one flywheel, said hysteresis mechanism and said member having freedom of movement relative to each other in said circumferential direction.

11. The apparatus of claim 10, wherein said input element includes a rotary shaft of said transmission.

12. The apparatus of claim 10, wherein said member includes Part which is radially spaced apart from a rotational axis of said one flywheel, said hysteresis mechanism being adjacent said part of said member.

13. The apparatus of claim 10, wherein said hysteresis mechanism includes elements which overlie said portions of said member, said portions of said member and said elements having said freedom of movement relative to each other in said circumferential direction of said flywheels.

14. The apparatus of claim 10, wherein said portions of said member form part of or constitute radially outermost portions of said member.

15. The apparatus of claim 10, wherein said energy storing means is located at a first radial distance from a rotational axis of said one flywheel and said hysteresis mechanism is disposed at a second radial distance from said axis, said second radial distance being greater than said first radial distance.

16. The apparatus of claim 11, further comprising means for limiting the angular movability of said flywheels relative to each other, said limiting means including abutments cooperating with said hysteresis mechanism.

17. The apparatus of claim 16, wherein said hysteresis mechanism includes components which are spaced apart from each other in said circumferential direction, which extend substantially radially of an axis of said one flywheel, which overlie said portions of said member, and which cooperate with said abutments to limit the extent of angular movability of said flywheels relative to each other.

18. The apparatus of claim 12, wherein said damper means comprises a first damper including said energy storing means and a second damper in series with said first damper and including second energy storing means.

19. Apparatus for compensating for angular shocks, comprising a first rotary flywheel connectable with a drive shaft; a second rotary flywheel connectable with a force transmitting means, said flywheels being rotatable with and relative to each other about a common axis and said second flywheel being mounted on said first flywheel, said second flywheel including a portion extending substantially radially of said axis and confronting said first flywheel as seen in the direction of said axis and said portion of said second flywheel being substantially parallel to said first flywheel; a bearing interposed between said flywheels; resilient means disposed between and extending in a circumferential direction of said flywheels; and a hysteresis mechanism disposed between said flywheels and arranged to generate a frictional force in response to rotation of said flywheels relative to each other, said hysteresis mechanism and said resilient means cooperating with each other to damp torsional vibrations of said flywheels and said hysteresis mechanism being form-lockingly connected with said second flywheel and comprising energy storing means acting in the direction of said axis.

20. The apparatus of claim 19, wherein said drive shaft includes a crankshaft of an engine.

21. The apparatus of claim 19, wherein said force transmitting means includes an input shaft of a transmission.

22. The apparatus of claim 19, wherein said energy storing means includes a diaphragm spring.

23. The apparatus of claim 19, wherein said hysteresis mechanism comprises a friction ring.

24. The apparatus of claim 19, wherein said first flywheel comprises an axial protuberance and said hysteresis mechanism is mounted on said protuberance.

25. The apparatus of claim 24, wherein said hysteresis mechanism surrounds said protuberance.

26. The apparatus of claim 19, wherein said first flywheel comprises an axial protuberance and said bearing is mounted on said protuberance.

27. The apparatus of claim 19, wherein said first flywheel includes a portion extending substantially radially of said axis and said hysteresis mechanism is disposed between said portion of said first flywheel and said bearing, as seen in the direction of said axis.

28. The apparatus of claim 19, wherein said bearing comprises at least one annulus of rolling elements.

29. Apparatus for compensating for angular shocks, comprising a first rotary flywheel connectable with a drive shaft; a second rotary flywheel connectable with a force transmitting means, said flywheels being rotatable with and relative to each other about a common axis through a predetermined angle between two end positions, said second flywheel being mounted on said first flywheel and including a portion extending substantially radially of said axis and confronting said first flywheel as seen in the direction of said axis, said portion of said second flywheel being substantially parallel to said first flywheel; a bearing interposed between said flywheels; resilient means disposed between and extending in a circumferential direction of said flywheels; a hysteresis mechanism disposed between said flywheels and arranged to generate a frictional force in response to rotation of said flywheels relative to each other, said hysteresis mechanism and said resilient means cooperating with each other to damp torsional vibrations of said flywheels and said hysteresis mechanism comprising energy storing means acting in the direction of said axis; and elastic means acting between said flywheels in said circumferential direction in at least one of said end positions.

30. The apparatus of claim 29, wherein said force transmitting means includes an input shaft of a transmission.

31. The apparatus of claim 29, wherein said drive shaft includes a crankshaft of an engine.

32. The apparatus of claim 29, wherein said elastic means comprises at least one coil spring.

33. The apparatus of claim 29, wherein said elastic means contains an elastomeric material.

34. The apparatus of claim 29, wherein said energy storing means includes a diaphragm spring.

35. The apparatus of claims 29, wherein said hysteresis mechanism comprises a friction ring.

36. The apparatus of claim 29, wherein said first flywheel comprises an axial protuberance and said hysteresis mechanism is mounted on said protuberance.

37. The apparatus of claim 36, wherein said hysteresis mechanism surrounds said protuberance.

38. The apparatus of claim 29, wherein said first flywheel comprises an axial protuberance and said bearing is mounted on said protuberance.

39. The apparatus of claim 29, wherein said first flywheel includes a portion extending substantially radially of said axis and said hysteresis mechanism is disposed between said portion of said first flywheel and said bearing, as seen in the direction of said axis.

40. The apparatus of claim 29, wherein said bearing comprises at least one annulus of rolling elements.

* * * * *